United States Patent
Sirbu

(10) Patent No.: US 7,428,664 B2
(45) Date of Patent: Sep. 23, 2008

(54) PROTOCOL REPLAY SYSTEM

(75) Inventor: Mihai Sirbu, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 617 days.

(21) Appl. No.: 11/048,028

(22) Filed: Jan. 31, 2005

(65) Prior Publication Data

US 2005/0141432 A1    Jun. 30, 2005

Related U.S. Application Data

(63) Continuation-in-part of application No. 10/295,870, filed on Nov. 18, 2002, now Pat. No. 7,062,680.

(51) Int. Cl.
*G06F 11/00* (2006.01)
(52) U.S. Cl. ......................... 714/39; 714/748
(58) Field of Classification Search .................. 714/39, 714/18, 49, 748–749; 370/466, 467
See application file for complete search history.

(56) References Cited

U.S. PATENT DOCUMENTS

| | | | | |
|---|---|---|---|---|
| 5,233,628 A | * | 8/1993 | Rappaport et al. | 375/224 |
| 5,287,506 A | * | 2/1994 | Whiteside | 714/39 |
| 6,708,292 B1 | * | 3/2004 | Mangasarian | 714/39 |
| 6,928,587 B2 | * | 8/2005 | Gernhardt | 714/39 |
| 7,062,680 B2 | * | 6/2006 | Sirbu | 714/39 |
| 7,096,264 B2 | * | 8/2006 | Bonney et al. | 709/224 |
| 2002/0004829 A1 | * | 1/2002 | Yasunami | 709/224 |
| 2003/0145039 A1 | * | 7/2003 | Bonney et al. | 709/202 |
| 2006/0259542 A1 | * | 11/2006 | Wu et al. | 709/202 |

\* cited by examiner

*Primary Examiner*—Dieu-Minh Le
(74) *Attorney, Agent, or Firm*—Steven A. Shaw; W. James Brady; Frederick J. Telecky, Jr.

(57) ABSTRACT

An expert protocol analyzer, which records a protocol exchange between two or more hardware devices on a network or software modules in a multiprogramming environment. To validate a potential fix, the protocol is replayed in a simulated network environment, where a replay unit replaces the endpoint that is not available in the lab, or which in the lab operates with a different timing. The replay unit behaves like one of the two original units of the. Individual messages are adjusted for the local network parameters and are sent with precise delay or timing recorded during the original exchange. This allows the user to recreate the failure scenario in the test lab.

17 Claims, 1 Drawing Sheet

PROTOCOL REPLAY SYSTEM

CROSS-REFERENCE TO RELATED APPLICATIONS

This application is a continuation-in-part of U.S. application Ser. No. 10/295,870, Expert System for Protocols Analysis, filed on Nov. 18, 2002 now U.S. Pat. No. 7,062,680.

FIELD OF THE INVENTION

The present invention relates generally to determining reasons for errors in a computing device or software module on a network. More particularly the preferred embodiment relates to an expert system on a communications network that captures protocol exchanges between two or more endpoints or devices and can replay protocol exchanges and timing of exchanged messages in a laboratory for nearly any protocol.

BACKGROUND OF THE INVENTION

Digital communication systems where information is transmitted in data packages between a header and trailer are generally known as packet networks. Packets sent over a packet network are defined by a set of rules called protocols. A packet or frame typically includes some type of data or information in between a header and a trailer. Computer networks, such as local area networks (LANs), can use different protocols to send and receive data. Switched-packet networks use individual packets or frames of data that are routed individually through a network from a source to a destination. Each packet is comprised of a number of layers of protocol headers and data, for one or more network protocols. Packets conforming to the network protocol must have elements that satisfy the defined data values at their respective offsets.

Protocols analyzers connect to the communications bus of a communication network, such as a packet network, and collect and store information relating to the data protocol units that are traveling on the bus. Typical types of information include the origin and type of packet, the number of bits in the packet or frame, a timestamp, the destination address of the packet, and other information. This information is useful for network engineers in determining equipment requirements, the source of network problems, and administration of a network.

Network analyzers, sometimes referred colloquially as network "sniffers," are helpful for network operations to capture and inspect packets as they travel through a particular location on the network. Packet inspections are performed in order to determine the quantities, distributions, and other parameters and protocols for packets. Analyzers capture and decode packets traveling between network hardware components. Packet details can be viewed to help isolate network problems and provide information on network traffic flow and monitoring. Some examples of network monitoring include traffic congestion, runaway traffic, traffic from each station or server, percent of bandwidth for a particular protocol, and isolation of traffic patterns. Protocol analyzers can capture packets in real time for immediate evaluation or save packets for a buffered analysis time, such as a first-in first-out buffer.

A network protocol defines the structure of valid packets formed according to the protocol. A protocol will define precisely the contents of a packet typically using a number of fields. Each field has a known offset from either the start of the packet or from the start of a predefined header. Offsets may be in bytes, bits, octets, or other units. For example, the specific order of the fields is defined, each field being followed by a specifically defined set of possible fields, each field have a specifically defined value or set of possible values.

Conventional network analyzers use microprocessors programmed by software to collect and store the packet information. However, systems cannot keep pace with high-speed network and data systems, therefore many systems resort to sampling data streams instead of analyzing each element of data. Some network analyzers use pattern matching to compare stored data for network protocols defining an FTP packet including an Internet Protocol ("IP") address with the captured data from the network. Patterns of matching criteria are applied to a captured packet wherein the packet is scanned a number of times, equaling the number of matching criteria patterns. This process is resource intensive and typically cannot track every packet in network traffic. The protocol analyzers in the prior art are based on comparing packet information with some type of lookup table or protocol database where the rules for packets are pre-defined for protocols or network management statistics, for example comparing whether a data element is a "match" to a particular network protocol.

FIG. 1 illustrates a schematic of a conventional network analyzer 10 connected to packet network 12. For illustrative purposes, a network equipment or device (E1) 14 is connected at one end on packet network 12 and a network equipment or device (E2) 16 is connected at another end of packet network 12. E1 and E2 may also be two software applications or systems connected to a shared communication mechanism 12. E1 and E2 are in communication with each other using certain protocols in the exchange of messages. Network analyzer 10 captures some or all of the messages contained in packets that are transferred between E1 14 and E2 16. When a system problem occurs with one of the hardware devices, either or both equipment pieces may be removed from the network 12 and sent to a laboratory by a technician for evaluation to determine where the fault is occurring. However, error messages or error detections that occur in the field (e.g., while operating on network 12) will often not reproduce themselves and thus create difficulty in trouble-shooting the problems. Errors could be any or all of a sequence of messages, timing of messages, and content of messages between E1 14 and E2 16 that are being tested in a lab.

Typically, only one network device, for example E2, is removed from a network for error analysis. However, even if E1 and E2 are brought into a laboratory operating on the same software, message transmissions between them will not replay exactly the same with the same order and timing, and the error analysis of the message exchanges will fail. This is because test network equipment in the laboratory have different network configurations and timings than network 12 in the field. Some content of protocol messages between devices on a network is based on the local configuration. Individual timing of messages may be critical in determining protocol errors. To analyze the problem in the lab, messages have to be replayed from a network device E2 16, or software within the device, at a specific time and using local network parameters and protocols.

Therefore, if protocol messages transmitted between hardware equipment E1 and E2 do not precisely reproduce the original network messages and timing of messages in a laboratory setting, and also using the local network parameters, there are problems reproducing error conditions and errors themselves that were detected on network 12.

Similar problems occur when diagnosing errors between two software programs operating on the same computer. For software diagnostics, E1 and E2 are different software programs, or different software modules, in the same computer, and connection 12 is an interprocess communication connection. Message transmissions between E1 and E2 will not replay exactly the same with the same order of timing as when the error first occurred, and the analysis of message exchanges to determine the exchange where an error is occurring will fail in a laboratory replay. This is because laboratory-tested network software may be located on a different computer in a lab or different setup configurations than the software programs in the field computer. At the least, the software programs are replayed at a later time in the laboratory, so that the real time message transmissions are not exactly replayed. Much of the content of protocol messages between software programs on a computer are exchange-specific, and timing of the messages are an important part of most protocols. Therefore, a message may be replayed using software program E2 16 and software program E1 14 at a different time using different setup parameters and protocols which may not repeat the same errors.

SUMMARY

The preferred embodiment provides an expert protocol analyzer, which records a protocol exchange between two or more hardware devices on a network or software modules in a multiprogramming environment. Each captured packet or message from a protocol exchange can include local network facts such as an IP routing header and sequence numbers, process ids, plus various connections dependent on the protocol exchange such as protocol headers, data fields, and redundancy checks. The system collects a number of facts and rules from the packets in a rule database and fact database, respectively. The databases contain programmed information based on existing protocols as well as dynamic rules generated from packet components, such as the timing of related messages. The protocol analysis engine analyzes the information components extracted from the captured packets for comparison matching on individual packets and across multiple packets to one or more protocols, and serves as the recorded database for the replay system. The invention is extensible for additional protocols and diagnostics by updating a knowledge database with dynamic rules for any application or protocol desired.

To validate a potential fix, the protocol is replayed in a simulated network environment, where a replay unit replaces the endpoint that is not available in the lab, or which in the lab operates with a different timing. The invention allows separating the recorded information into protocol-specific, network-specific, and timing elements. For example, a protocol-specific element is the value of a token received, and which has to be reused in the response. A network-specific element can be the address of a port, while the timing shows how fast a reply is sent. As one skilled in the art knows, the above are merely embodiments of the present invention, and are non-limiting.

A further aspect of the invention invention includes a protocol replay mechanism, in which a replay unit behaves like one of the two original units of the exchange, and sends out messages similar to the unit mirrored. Individual messages are adjusted for the local network parameters (for example using different IP addresses and port numbers during the exchange), and are sent with the precise delay or timing recorded during the original exchange. This allows the user to recreate the failure scenario in the test lab. In the failure recreation scenario, the user has the ability to change protocol values and time parameters, in advance or during the replay process.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EMBODIMENTS

Figure 1:
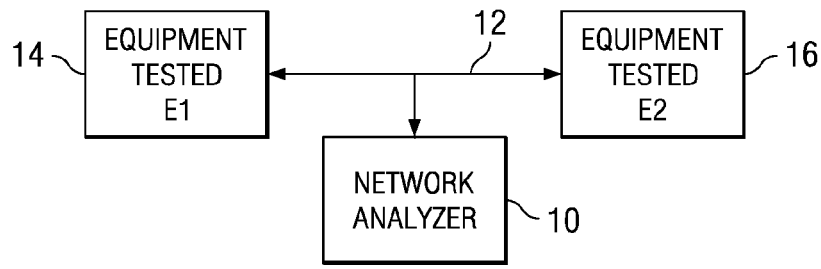
FIG. 1 is a schematic of a network analyzer.
Figure 2:
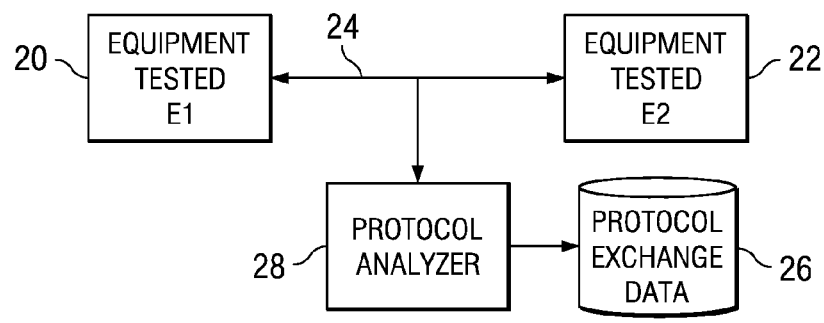
FIG. 2 is an schematic of an expert system for protocol analysis in a field venue.

The preferred embodiment of the present invention is illustrated in the block diagram of FIG. 2. A protocol analyzer 28 is connected to communication network 24, such as a packet network, in a "field" venue such as an office, campus, or Internet Protocol (IP) voice network. A network equipment or device (E1) 20 is connected at one end on packet network 24 and a network equipment or device (E2) 22 is connected at another end of packet network 24. E1 and E2 may also be two software applications or systems connected to a shared communication mechanism 24. E1 and E2 are in communication with each other using certain protocols in the exchange of messages. Protocol analyzer 28 captures some or all of the messages contained in packets that are transferred between E1 20 and E2 22. The protocol exchanges between network devices E1 and E2 is analyzed and recorded by the protocol analyzer 28, and stored as protocol exchange data in database 26. E2 is the unit that is not available in the lab, or which in the lab does not operate with the same network timing. E1 is the unit in which the problem needs to be diagnosed or the unit in which the problem might be fixed. The information recorded for each packet can include the transmission time, timing intervals from significant network events, protocol information, and local network information elements for each field. These details allow a protocol replay system of the preferred embodiment, illustrated in the block diagram of FIG. 3, to generate equivalent packets in a laboratory venue.

Figure 3:
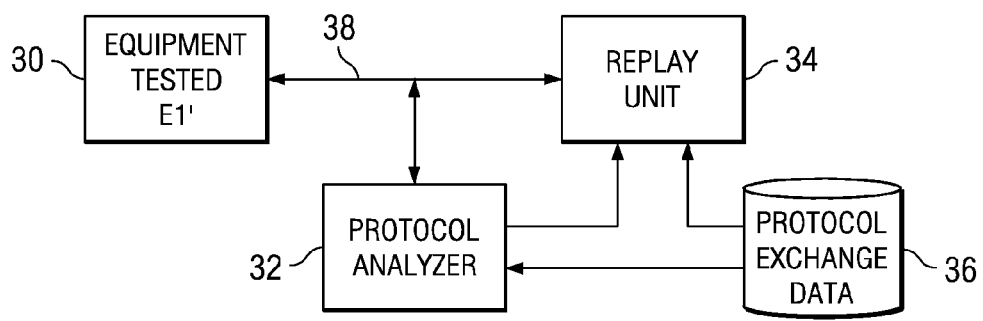
FIG. 3 is an schematic of an expert system for protocol analysis in a laboratory venue.

Referring to FIG. 3, a simulated network 30 of communications network 24 is created in a laboratory for testing a simulated protocol exchange between equipment device or software module E1' 30 and a Replay Unit 34. Network 30 includes a diagnostic version of E1 20 called E1' 30. E1' 30 can be the original E1 20 or a duplicate device or module with connected or embedded testing and diagnostics components. In the laboratory venue, it is assumed that it may not be feasible or desirable to remove or substitute Equipment E2 22 in a laboratory. Instead of an original equipment E2 22, a device simulating E2 called a Replay Unit 34 is attached on network 38. A protocol analyzer 32 is connected to network 38 and to the replay unit 34. Protocol analyzer 32 is may be the same protocol analyzer 28 on network 24 or an equivalent that can function similarly. A copy of the protocol exchange data recorded in the field on network 24 is available from protocol exchange database 26 to both the protocol analyzer 32 and replay unit 34.

As stated previously, there are problems that occur while attempting to reproduce the same network 24 conditions on simulated network 38, and therefore problems occur attempting to reproduce the same errors between E1 20 and E2 22 in a laboratory venue. Equipment E1' 30 is not identical in every aspect to equipment E1 20, even though the equipment may be the same version, same model, and are operating the same software. This is because the two equipment devices E1 20 and E1' 30 operate on different networks 24 and 38, respectively. The role of the replay unit 34 is to modify the messages initially originated by E2 22 to adjust to the local network 38 data and timing.

Relative timing of the messages for a protocol is an important part of the exchange. Messages are usually transmitted in replay to a message from a different hardware or software device. For example, if E2 22 transmitted an alert message to E1 20 at 200 ms after a setup, the replay unit 34 must keep the same relative timing on simulated network 38. The preferred embodiment provides that, for each current message to be transmitted on simulated network 38 in replay to a prior message or event, the current message is transmitted with the same relative timing as the original message on network 24. An alternative embodiment allows the operator to adjust the timing of messages compared to the recorded exchange time, either through stored constants or expressions, or in real time.

For simulations on network 38, the messages fields that are network-dependent are adjusted to conform to the local network 38 values. For example, if E1 20 and E2 22 have a specific telephone numbers on a voice over IP network and E1' 30 is transmitting a different telephone number, then the new telephone number must be inserted into messages transmitted by the replay unit 34 into network 38. Furthermore, the IP address and port numbers of E1' 30 and the replay unit may not match the exact IP addresses and port numbers of E1 20 and E2 22, respectively. For example, E2 22 transmits a message to port number 2000 which was opened by E1 20. In the lab network E1' 30 actually opens the port number 3000. Then, the replay unit 34 must transmit the message to port 3000 on E1' 30, and must also replace the port number 2000 with 3000 in every message that contains the port number. It is imperative not to replace the number 2000 in other contexts, such as a byte count or a numeric value. Other message fields may have to be updated as a result of this substitution, such as field lengths and checksums.

The replay unit 34 and protocol analyzer 34 also allow a user to recreate the failure scenario in the test lab by changing protocol values and time parameters in advance of a test or during the replay process.

The present invention applies to any protocol on a network for any type of hardware or software that transmits messages between homogeneous or heterogenous endpoints. The embodiments provide for reproducing in a laboratory hardware or software problems that are experienced in the field. Protocol exchanges are captured between two or more hardware devices and are replayed with exact protocol exchanges and timing of the messages.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A system to replay protocol exchanges in a network, comprising:
    a protocol analyzer that captures protocol messages on a network between a first device and a second device during a network transmission;
    a simulated network that is similar to said network;
    a third device, similar to said first device, connected to said simulated network; and
    a protocol replay unit, connected to said simulated network, that replays said protocol messages between said third device and said replay unit over said simulated network,
    wherein a second network transmission between said replay unit and said third device is dynamically adjusted for local parameters of said simulated network in order to simulate said network transmission.

2. The system of claim 1, wherein said replay unit modifies said protocol messages for replay on said simulated network by dynamically adjusting said protocol messages to local parameters of said simulated network including at least inserting a new telephone number into messages transmitted by said protocol replay unit.

3. The system of claim 2, wherein the protocol replay unit dynamically modifies an IP address, a plurality of port numbers, field lengths and check-sums.

4. The system of claim 1, wherein said replay unit replays said protocol messages over said simulated network using a similar relative timing as a timing that was captured by said protocol analyzer.

5. The system of claim 4, wherein said relative timing of said messages on said simulated network may be adjusted using an automated procedure.

6. The system of claim 1, wherein data from said protocol analyzer is accessible through a database connected to said simulated network, after said protocol analyzer captures said protocol messages, for simulating a protocol exchange between said third device and said reply unit.

7. The system of claim 1, further comprising:
    a second protocol analyzer, connected to said simulated network,
    wherein said second protocol analyzer provides said captured protocol messages in a database for replay on said simulated network.

8. A method to replay protocol exchanges in a network, comprising:
    capturing protocol messages on a network between a first device and a second device during a network transmission;
    providing a simulated network that is similar to said network;
    providing a third device, similar to said first device, connected to said simulated network;
    replaying said protocol messages between said third device and a replay unit over said simulated network; and
    dynamically adjusting a second network transmission for local parameters of said simulated network in order to simulate said network transmission during said replaying.

9. The method of claim 8, wherein said replaying comprises modifying said protocol messages for replay on said simulated network by dynamically adjusting said protocol messages to local parameters of said simulated network and at least inserting a new telephone number into messages transmitted by protocol replay unit.

10. The method of claim 9, further comprising dynamically modifying an IP address, a plurality of port numbers, field lengths and check-sums.

11. The method of claim 8, wherein said replaying replays said protocol messages over said simulated network using a similar relative timing as a timing that was captured by a protocol analyzer.

12. The method of claim 11, wherein said relative timing of said messages on said simulated network may be adjusted using of a manual and automatic procedure.

13. The method of claim 8, further comprising:

providing data from a protocol analyzer that is accessible through a database connected to said simulated network, after said capturing, for simulating a protocol exchange between said third equipment and said reply unit.

14. The method of claim 8, further comprising:

determining an error in said third equipment based on said replay of said protocol messages on said simulated network.

15. A system to replay protocol exchanges in a network, comprising:

a protocol analyzer that captures protocol messages on a network between a first software module and a second software module during a network transmission;

a simulated network that is similar to said network;

a third software module, similar to said first software module, connected to said simulated network; and a protocol replay unit, connected to said simulated network, that replays said protocol messages between said third software module and said replay unit over said simulated network;

wherein a second network transmission between said replay unit and said third software module is dynamically adjusted for local parameters of said simulated network in order to simulate said network transmission.

16. The system of claim 15, wherein the protocol replay unit dynamically modifies said protocol messages for replay on said simulated network by adjusting said protocol messages to local parameters of said simulated network including inserting a new telephone number into messages transmitted by protocol replay unit.

17. The system of claim 16, wherein the protocol replay unit dynamically modifies an IP address, a plurality of port numbers, field lengths and check-sums.

* * * * *